United States Patent
Kim (10) Patent No.: US 11,967,336 B2
(45) Date of Patent: Apr. 23, 2024

(54) METHOD FOR PROVIDING SPEECH VIDEO AND COMPUTING DEVICE FOR EXECUTING THE METHOD

(71) Applicant: DEEPBRAIN AI INC., Seoul (KR)

(72) Inventor: Doohyun Kim, Gyeonggi-do (KR)

(73) Assignee: DEEPBRAIN AI INC., Seoul (KR)

( * ) Notice: Subject to any disclaimer, the term of this patent is extended or adjusted under 35 U.S.C. 154(b) by 0 days.

(21) Appl. No.: 17/598,470

(22) PCT Filed: Dec. 22, 2020

(86) PCT No.: PCT/KR2020/018937
§ 371 (c)(1),
(2) Date: Sep. 27, 2021

(87) PCT Pub. No.: WO2022/092439
PCT Pub. Date: May 5, 2022

(65) Prior Publication Data
US 2023/0335151 A1    Oct. 19, 2023

(30) Foreign Application Priority Data

Oct. 30, 2020 (KR) .................. 10-2020-0142744

(51) Int. Cl.
*G10L 21/10*    (2013.01)
*G10L 13/027*   (2013.01)

(52) U.S. Cl.
CPC ............ *G10L 21/10* (2013.01); *G10L 13/027* (2013.01); *G10L 2021/105* (2013.01)

(58) Field of Classification Search
CPC .......................... G10L 2021/105; G10L 21/10
See application file for complete search history.

(56) References Cited

U.S. PATENT DOCUMENTS

| 4,260,229 A * | 4/1981 | Bloomstein ............ G03B 31/02 704/E21.02 |
| 2004/0120554 A1* | 6/2004 | Lin ........................ G06V 40/20 704/E21.02 |
| 2017/0287481 A1 | 10/2017 | Bhat et al. |

FOREIGN PATENT DOCUMENTS

| CN | 109448083 A | 3/2019 |
| KR | 10-2000-0009490 A | 2/2000 |

(Continued)

OTHER PUBLICATIONS

Office action dated Feb. 14, 2022 from Korean Patent Office in a counterpart Korean Patent Application No. 10-2020-0142744 (all the cited references are listed in this IDS.) (English translation is also submitted herewith.).

(Continued)

*Primary Examiner* — Feng-Tzer Tzeng
(74) *Attorney, Agent, or Firm* — The PL Law Group, PLLC (57) ABSTRACT

A computing device according to an embodiment is a computing device that is provided with one or more processors and a memory storing one or more programs executed by the one or more processors, the computing device includes a standby state video generating module that generates a standby state video in which a person in a video is in a standby state, a speech state video generating module that generates a speech state video in which a person in a video is in a speech state based on a source of speech content, and a video reproducing module that reproduces the standby state video, and generates a synthesized speech video by synthesizing the standby state video being reproduced and the speech state video.

9 Claims, 4 Drawing Sheets

(56) References Cited

FOREIGN PATENT DOCUMENTS

KR      10-2008-0019842 A      3/2008
KR      10-2019-0114150 A      10/2019
WO      WO 2017/094527 A1      6/2017

OTHER PUBLICATIONS

Prajwal K R et al., "Towards Automatic Face-to-Face Translation", MM '19, Oct. 21-25, 2019, Nice, France.
Office action dated Jul. 26, 2022 from Korean Patent Office in a counterpart Korean Patent Application No. 10-2020-0142744 (all the cited references are listed in this IDS.) (English translation is also submitted herewith.).
Amir Jamaludin et al., "You Said That?: Synthesising Talking Faces from Audio", International Journal of Computer Vision, 2019, 127, pp. 1767-1779, DOI:10.1007/s11263-019-01150-y.
Iryna Korshunova et al, "Fast Face-Swap Using Convolutional Neural Networks", proceedings of the IEEE International Conference on Computer Vision (ICCV), 2017, pp. 3677-3685, arXiv:1611.09577.

\* cited by examiner

METHOD FOR PROVIDING SPEECH VIDEO AND COMPUTING DEVICE FOR EXECUTING THE METHOD

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2020/018937, filed Dec. 22, 2020, which claims priority to the benefit of Korean Patent Application No. 10-2020-0142744 filed in the Korean Intellectual Property Office on Oct. 30, 2020, the entire contents of which are incorporated herein by reference.

BACKGROUND

1. Technical Field

An embodiment of the present invention relates to a technology for providing a speech video.

2. Background Art

Recently, various types of content are being generated based on an artificial intelligence (AI) technology as the technology advances in the field of AI. As an example, when there is a voice message to be delivered, there is a case of trying to attract people's attention by generating a speech moving picture such as a famous person (e.g., a president, etc.) speaking the voice message. This is implemented by generating a mouth shape, etc. to fit a specific message, just like a famous person speaking the specific message in a video of the famous person.

In addition, technologies that allow AI to communicate with humans (e.g., video calls, etc.) are being studied. These technologies have a problem in that it is difficult to generate a video of conversation (or a video of speaking) in real time because it takes time to synthesize the speech video and requires a lot of data.

SUMMARY

An embodiment of the present invention is to provide a new technique for providing an artificial intelligence-based speech video in real time.

A computing device according to an embodiment disclosed is a computing device that is provided with one or more processors and a memory storing one or more programs executed by the one or more processors, the computing device includes a standby state video generating module that generates a standby state video in which a person in a video is in a standby state, a speech state video generating module that generates a speech state video in which a person in a video is in a speech state based on a source of speech content, and a video reproducing module that reproduces the standby state video, and generates a synthesized speech video by synthesizing the standby state video being reproduced and the speech state video.

The video reproducing module may generate the synthesized speech video by synthesizing a preset reference frame of the standby state video being reproduced and the speech state video.

The reference frame may be a first frame of the standby state video.

The standby state video generating module may generate a standby state video having a preset reproduction time and generate one or more back motion images for one or more frames included in the standby state video, and the video reproducing module may return the standby state video being reproduced to the reference frame based on the back motion image and generate the synthesized speech video by synthesizing the returned reference frame and the speech state video.

The back motion image may be for image interpolation between a corresponding frame of the standby state video and the reference frame of the standby state video.

The back motion image may be generated at a preset frame interval among the frames included in the standby state video, and the video reproducing module may detect a closest frame having the back motion image among frames after a current frame of the standby state video being reproduced, and return the standby state video to the reference frame based on the back motion image of the detected frame, and generate the synthesized speech video by synthesizing the returned reference frame and the speech state video.

The video reproducing module may reproduce the standby state video again from an end time point of the speech state video when the speech state video ends while the synthesized speech video is reproduced and reproduce the standby state video by returning the standby state video to the reference frame based on a back motion image of a last frame of the standby state video when the standby state video ends.

The speech state video generating module may generate a voice part and a video part of the speech state video, respectively, based on the source of the speech content and generate the video part for a face portion of the person in the standby state video.

The video reproducing module may replace the face portion of the standby state video with the video part of the speech state video, and generate the synthesized speech video by synthesizing the standby state video in which the face portion is replaced and the voice part of the speech state video.

A computing device according to another embodiment disclosed is a computing device that is provided with one or more processors and a memory storing one or more programs executed by the one or more processors, the computing device includes a standby state video generating module that generates a standby state video in which a person in a video is in a standby state, and a video reproducing module that transmits a source of speech content to a server, receives a speech state video in which a person in a video is in a speech state from the server, reproduces the standby state video, and generates a synthesized speech video by synthesizing the standby state video being reproduced and the speech state video.

A method of providing a speech video according to an embodiment disclosed is a method performed in a computing device that is provided with one or more processors and a memory for storing one or more programs executed by the one or more processors, the method including an operation of generating a standby state video in which a person in a video is in a standby state, an operation of generating a speech state video in which a person in a video is in a speech state based on a source of speech content, and an operation of reproducing the standby state video, and generating a synthesized speech video by synthesizing the standby state video being reproduced and the speech state video.

A method of providing a speech video according to another embodiment disclosed is a method performed in a computing device that is provided with one or more processors and a memory for storing one or more programs executed by the one or more processors, the method including an operation of generating a standby state video in which a person in a video is in a standby state, an operation of transmitting a source of speech content to a server, an operation of receiving a speech state video in which a person in a video is in a speech state from the server, and an operation of reproducing the standby state video, and generating a synthesized speech video by synthesizing the standby state video being reproduced and the speech state video.

According to a disclosed embodiment, a synthesized speech video can be generated in real time by preparing a standby state video in advance, generating a speech state video while the standby state video is being reproduced, and synthesizing the speech state video with the standby state video, which makes it possible to provide an artificial intelligence-based conversation-related service in real time.

In addition, a video part is generated for a face portion of a person in the standby state video when generating the speech state video and a synthesized speech video is generated by replacing the face portion of the standby state video with the video part of the speech state video, thereby capable of reducing an amount of data while reducing the time required for generating the synthesized speech video.

In addition, a back motion image is prepared in a frame of the standby state video and synthesize a first frame of the standby state video and the speech state video after returning the standby state video being reproduced through the back motion image to the first frame, thereby capable of easily generating the speech state video without considering other variables even when the speech state video is generated while the standby state video is being reproduced.

DETAILED DESCRIPTION

Hereinafter, specific embodiments of the present invention will be described with reference to the accompanying drawings. The following detailed description is provided to aid in a comprehensive understanding of a method, a device and/or a system described in the present specification. However, the detailed description is only for illustrative purpose and the present invention is not limited thereto.

In describing the embodiments of the present invention, when it is determined that a detailed description of known technology related to the present invention may unnecessarily obscure the gist of the present invention, the detailed description thereof will be omitted. In addition, terms to be described later are terms defined in consideration of functions in the present invention, which may vary depending on intention or custom of a user or operator. Therefore, the definition of these terms should be made based on the contents throughout this specification. The terms used in the detailed description are only for describing the embodiments of the present invention and should not be used in a limiting sense. Unless expressly used otherwise, a singular form includes a plural form. In this description, expressions such as "including" or "provided with" are intended to indicate any property, number, step, element, and some or combinations thereof, and such expressions should not be interpreted to exclude the presence or possibility of one or more other properties, numbers, steps, elements other than those described, and some or combinations thereof.

In the following description, terms such as "transfer", "communication", "transmission", "reception" of a signal or information, or other terms having similar meanings to these terms include not only a meaning that a signal or information is directly sent from one component to another component, but also a meaning that a signal or information is sent via another component. In particular, "transferring" or "transmitting" a signal or information to one component indicates that the signal or information is "transferred" or "transmitted" to the final destination of the signal or information, and does not mean that the component is a direct destination of the signal or information. The same is true for the "reception" of a signal or information. Also, in this specification, the fact that two or more pieces of data or information are "related" to each other means that when one piece of data (or information) may be acquired, at least a part of pieces of other data (or information) may be acquired based on the acquired data (information).

In addition, terms such as first and second may be used to describe various components, but the components should not be limited by the terms. The terms described above may be used for the purpose of distinguishing one component from another component. For example, without departing from the scope of the present invention, a first component may be referred to as a second component, and similarly, the second component may also be referred to as the first component.

Figure 1:
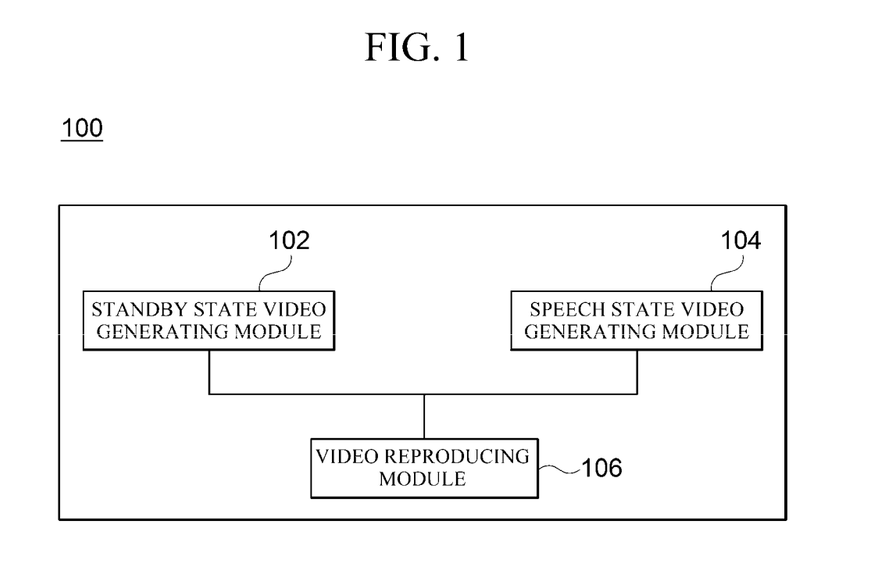
FIG. 1 is a block diagram illustrating a configuration of an apparatus for providing a speech video according to an embodiment of the present invention.

FIG. 1 is a block diagram illustrating a configuration of an apparatus for providing a speech video according to an embodiment of the present invention.

Referring to FIG. 1, an apparatus for providing a speech video 100 may include a standby state video generating module 102, a speech state video generating module 104, and a video reproducing module 106.

In one embodiment, the standby state video generating module 102, the speech state video generating module 104, and the video reproducing module 106 may be implemented using one or more physically separated devices, may be implemented by one or more processors or a combination of one or more processors and software, and unlike the illustrated example, may not be clearly distinguished in a specific operation.

In an exemplary embodiment, the apparatus for providing a speech video 100 may be an apparatus for performing a conversation (AI conversation) or a video call (AI video call) using artificial intelligence, but is not limited thereto. The apparatus for providing a speech video 100 may generate a speech video (e.g., a speech video for a conversation or video call) based on artificial intelligence and display the generated speech video on a screen, or transmit the generated speech video to the outside (e.g., a conversation counterpart's terminal or a relay server that relays the conversation counterpart's terminal and the apparatus for providing a speech video 100, etc.).

For example, the apparatus for providing a speech video 100 may be installed in a user terminal that wants to communicate with artificial intelligence, and may be installed in various apparatuses or facilities such as an unmanned ordering kiosk, an electronic information desk, an outdoor advertising screen, a robot, etc.

Here, the speech video is a video synthesized based on artificial intelligence, and is a video spoken by a predetermined person. Here, the predetermined person may be a virtual person or a person widely known to the public, but is not limited thereto.

The standby state video generating module 102 may generate a video (hereinafter, may be referred to as a standby state video) in which a person in the video is in a standby state. Here, the standby state may be a state before the person in the video speaks (e.g., a state of listening to the other person's words, etc.).

The standby state video generating module 102 may generate a standby state video having a preset reproduction time (e.g., 5 seconds to 30 seconds, etc.). The standby state video may be provided to express a natural motion while the person in the video is in the standby state. That is, the standby state video may be provided to naturally express a facial expression, posture, and motion of the person in the video (e.g., nodding the head, holding hands and listening, tilting the head, smiling facial expressions, etc.) while the person in the video listens to the other person's words.

The standby state video has a preset reproduction period, and thus includes a plurality of frames. In addition, each frame in the standby state video may include a changed image in order to express a natural motion while the person in the video is in the standby state. In an exemplary embodiment, when the standby state video is reproduced from the first frame to the last frame, the standby state video may be provided to be repeatedly reproduced by returning from the last frame to the first frame again.

The standby video generating module 102 may generate a back motion image in addition to each frame of the standby state video. The back motion image may be for image interpolation between any frame of the standby state video and a preset reference frame of the standby state video. Hereinafter, it will be described as an example that the reference frame is the first frame of the standby image. However, the reference frame is not limited the first frame.

The standby state video generating module 102 may generate the back motion image so that any frame and the first frame are naturally connected when returning from any frame of the standby state video to the first frame (i.e., the reference frame) of the standby state video.

Figure 2:
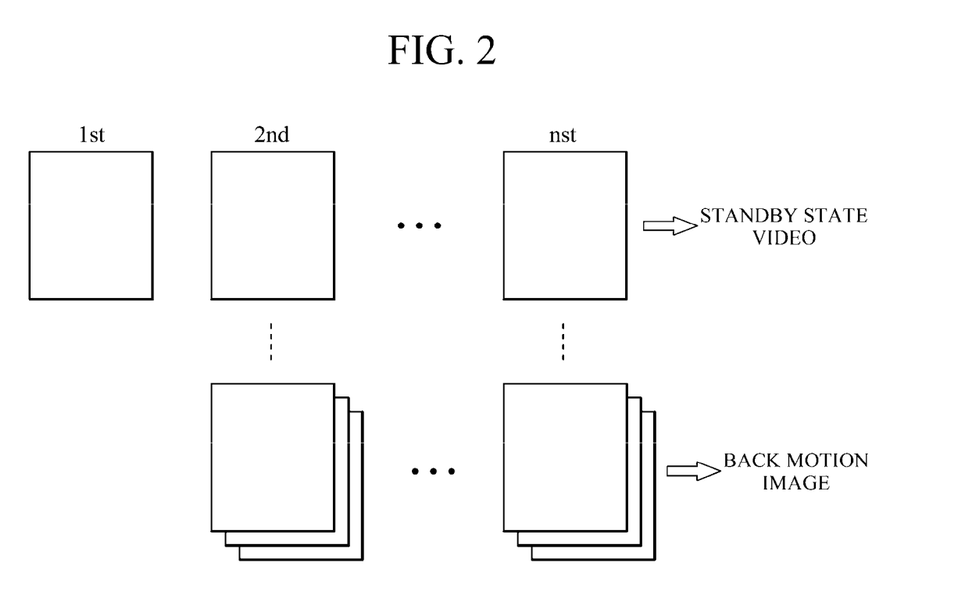
FIG. 2 is a diagram schematically illustrating a state in which a back motion image is generated in a frame of a standby state video in an embodiment of the present invention.

In an exemplary embodiment, the standby state video generating module 102, as illustrated in FIG. 2, may generate the back motion image for each of frames (from a second frame (2nd) to an n-th frame (n-th)) except for the first frame (1st) of the standby image. That is, the standby state video generating module 102 may generate the back motion image for image interpolation between the corresponding frame and the first frame for each frame except for the first frame of the standby state video. In this case, one or more back motion images may be provided for each frame. However, the present invention is not limited thereto, and the back motion image may also be generated at each preset frame interval in the standby state video.

The speech state video generating module 104 may generate a video (hereinafter, may be referred to as a speech state video) in which a person in the video is in a speech state. Here, the speech state may mean a state in which a person in the video is speaking (e.g., speaking to the counterpart, such as in a conversation or video call). The speech state video generating module 104 may generate the speech state video based on a source of input speech content. The source of the speech content may be in the form of text, but is not limited thereto, and may be in the form of a voice.

The source of the speech content may be generated through artificial intelligence by the apparatus 100 for providing a speech video analyzing the speech of the counterpart, but is not limited thereto, and may be input from an external apparatus (not illustrated) (e.g., an apparatus that analyzes the counterpart's speech and generates a source of speech content) or an administrator. Hereinafter, it will be described as an example that the source of the speech content is text.

The speech state video generating module 104 may generate a voice part and a video part of the speech state video, respectively, based on the text (e.g., "Hello, I'm AI tutor Danny") of the speech content, and generate the speech state video by synthesizing the generated voice part and video part. Since the text-based voice and video generation technology is a known technology, a detailed description thereof will be omitted.

When generating a video part based on the text of the speech content, the speech state video generating module 104 may generate the video part for a face portion of the person in the standby state video. As such, by generating the video part for the face portion of the person in the speech state video, it is possible to reduce a data capacity while generating the speech state video more quickly.

The video reproducing module 106 may reproduce the standby state video generated by the standby state video module 102. The video reproducing module 106 may reproduce the standby state video and provide the standby state video to the conversation counterpart. In an exemplary embodiment, the video reproducing module 106 may reproduce the standby state video and display the standby state video on a screen provided in the apparatus for providing a speech video 100. In this case, the conversation counterpart may have a conversation with the person in the video while looking at the screen of the apparatus for providing a speech video 100.

In addition, the video reproducing module 106 may reproduce a standby state video and transmit the standby state video to an external apparatus (e.g., the terminal of the conversation counterpart or the relay server, etc.). In this case, a video may be provided to the conversation counterpart through his/her terminal (e.g., smartphone, tablet PC, notebook computer, desktop PC, etc.), an unmanned ordering kiosk, an electronic information desk, an outdoor advertising screen, or the like, and the conversation counterpart may have a conversation with the person in the video.

When the speech state video is generated while the standby state video is being reproduced, the video reproducing module 106 may generate a synthesized speech video by synthesizing the standby state video and the speech video, and reproduce the synthesized speech video. The video reproducing module 106 may provide the synthesized speech video to the conversation counterpart.

Figure 3:
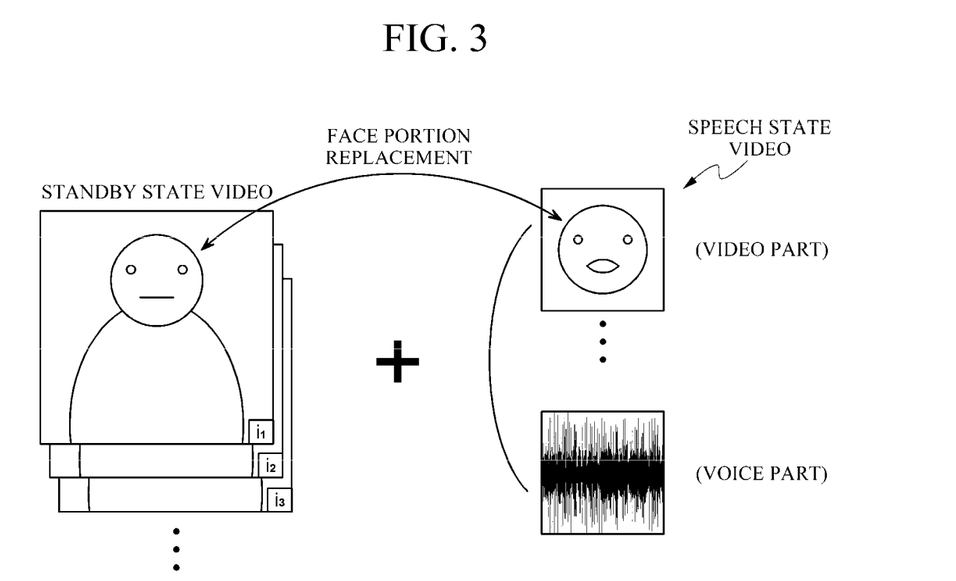
FIG. 3 is a diagram schematically illustrating a state in which a standby state video and a speech state video are synthesized in an embodiment of the present invention.

FIG. 3 is a diagram schematically illustrating a state in which the standby state video and the speech state video are synthesized in an embodiment of the present invention. Referring to FIG. 3, the video reproducing module 106 may generate a synthesized speech video by replacing a face portion of the standby state video with a video part (i.e., the face portion of the person) of the speech state video and synthesizing the voice part of the speech state video with the video part.

In an exemplary embodiment, the video reproducing module 106 may return to the first frame of the standby state video when generation of the speech state video is completed while reproducing the standby state video, and generate a synthesized speech video by synthesizing a preset reference frame of the standby state video and the speech state video. For example, the synthesis of the standby state video and the speech state video may be performed in the first frame of the standby state video.

In this case, by unifying a synthesis point of the standby state video and the speech state video, the synthesized speech video can be easily generated by synthesizing the standby state video and the speech state video even without considering other variables (e.g., a network environment between the apparatus for providing a speech video 100 and the counterpart terminal, etc.) even if the speech state video is generated at any time during reproduction of the standby state video.

In this case, the video reproducing module 106 may return the standby state video being reproduced to the first frame (i.e., the reference frame) in order to synthesize the first frame of the standby state video and the speech state video, and then synthesize the first frame of the standby state video and the speech state video.

Figure 4:
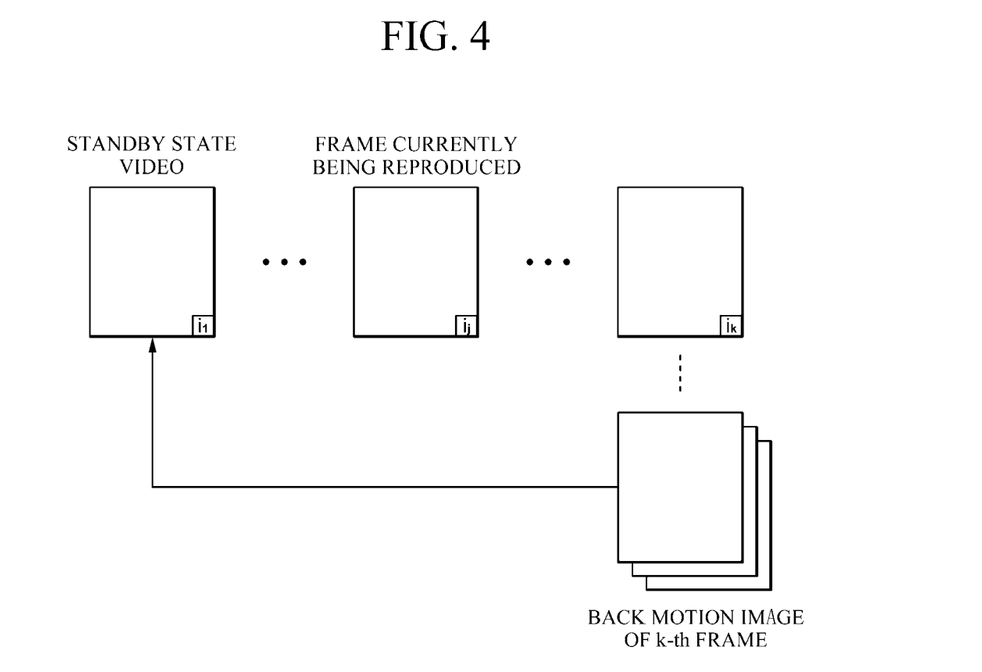
FIG. 4 is a diagram schematically illustrating a state in which a video reproducing module returns the standby state video being reproduced to a first frame in an embodiment of the present invention.

FIG. 4 is a diagram schematically illustrating a state in which the video reproducing module 106 returns the standby state video being reproduced to the first frame in an embodiment of the present invention. Referring to FIG. 4, when a speech state video is generated in a j-th frame during reproduction of the standby state video and the standby state video and the spoken state video are synthesized, the video reproducing module 106 may detect the closest frame having a back motion image among frames after the j-th frame currently being reproduced of the standby state video.

For example, when the closest frame having the back motion image among frames after the j-th frame is a k-th frame, the video reproducing module 106 may return the standby state image to the first frame by using the back motion image of the k-th frame. That is, the video reproducing module 106 may reproduce the back motion image of the k-th frame to naturally return the standby state video to the first frame. The video reproducing module 106 may generate a synthesized speech video by synthesizing the first frame of the standby state video and the speech state video.

If the speech state video ends while the synthesized speech video is being reproduced, the video reproducing module 106 may reproduce the standby state video again from an end time point of the speech state video. When the standby state video ends, the video reproducing module 106 may reproduce the standby state video by returning to the first frame of the standby state video by using the back motion image of the last frame of the standby state video.

According to the disclosed embodiment, a synthesized speech video can be generated in real time by preparing a standby state video in advance, generating a speech state video while the standby state video is being reproduced, and synthesizing the speech state video with the standby state video, which makes it possible to provide an artificial intelligence-based conversation-related service in real time.

In addition, a video part is generated for a face portion of a person in the standby state video when generating the speech state video and a synthesized speech video is generated by replacing the face portion of the standby state video with the video part of the speech state video, thereby capable of reducing an amount of data while reducing the time required for generating the synthesized speech state video.

In addition, a back motion image is prepared in a frame of the standby state video and synthesize a first frame of the standby state video and the speech state video after returning the standby state video being reproduced through the back motion image to the first frame, thereby capable of easily generating the speech state video without considering other variables even when the speech state video is generated while the standby state video is being reproduced.

In this specification, a module may mean a functional and structural combination of hardware for carrying out the technical idea of the present invention and software for driving the hardware. For example, the "module" may mean a logical unit of a predetermined code and a hardware resource for executing the predetermined code, and does not necessarily mean physically connected code or a single type of hardware.

Figure 5:
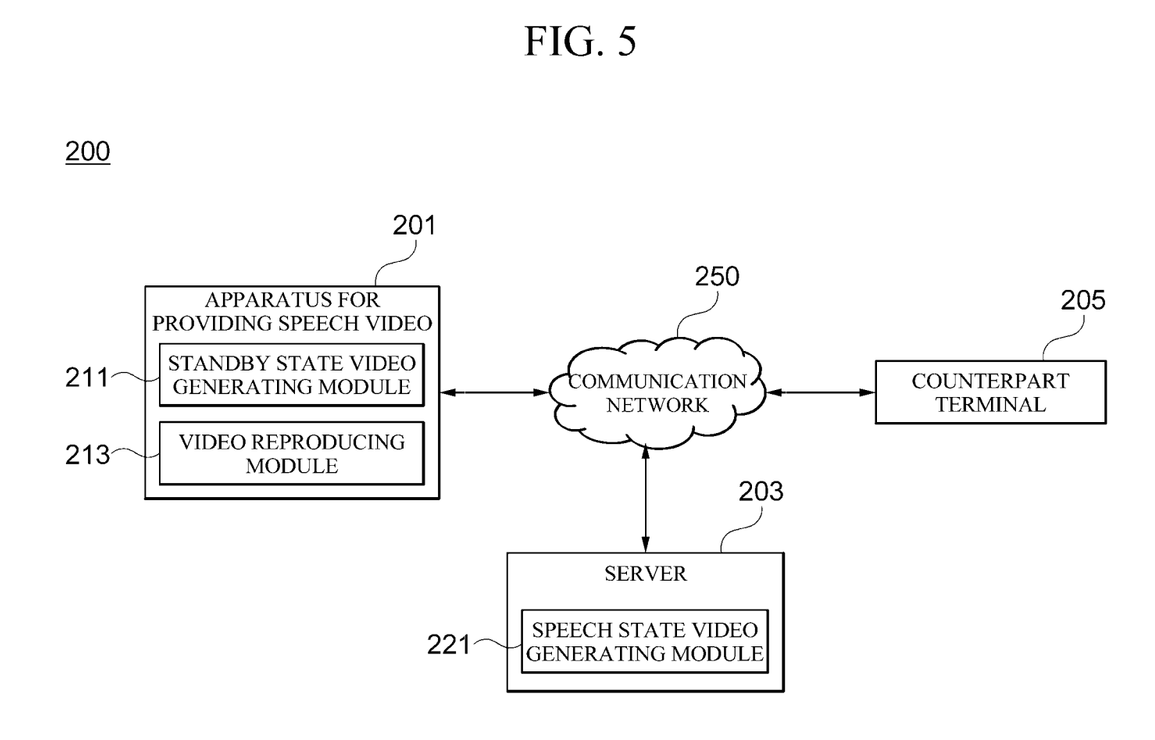
FIG. 5 is a diagram illustrating a configuration of a system for providing a speech video according to an embodiment of the present invention.

FIG. 5 is a diagram illustrating a configuration of a system for providing a speech video according to an embodiment of the present invention.

Referring to FIG. 5, a system for providing a speech video 200 may include an apparatus for providing a speech video 201, a server 203, and a counterpart terminal 205. The apparatus for providing a speech video 201 may be connected to the server 203 and the counterpart terminal 205 through a communication network 250 as to be communicable.

In some embodiments, the communication network 250 may include the Internet, one or more local area networks, wide area networks, cellular networks, mobile networks, other types of networks, or a combination of these networks.

The apparatus for providing a speech video 201 may include a standby state video generating module 211 and a video reproducing module 213. Here, since the standby state video generating module 211 is the same as the standby state video generating module 102 illustrated in FIG. 1, a detailed description thereof will be omitted.

When a source of speech content is input, the video reproducing module 213 may transmit the source of the speech content to the server 203. The server 203 may generate a speech state video based on the source of the speech content. That is, the server 203 may include a speech state video generating module 221. In an exemplary embodiment, the server 203 may generate a speech state video (i.e., a voice part and a video part) from the source of the speech content based on machine learning technology. The server 203 may transmit the generated speech state video to the video reproducing module 213.

The video reproducing module 213 may reproduce a standby state video and provide the standby state video to the counterpart terminal 205. When receiving the speech state video for a preset time from the server 203 while reproducing the standby state video, the video reproducing module 213 may generate a synthesized speech video by synthesizing the received speech state video and the standby state video. The video reproducing module 213 may provide the synthesized speech video to the counterpart terminal 205.

When the next time amount of the speech state video is not received from the server 203, the video reproducing module 213 may wait until the next time amount of the speech video is received from the server 203 and then generate a synthesized speech video by synthesizing the received speech state video and the standby state video.

Figure 6:
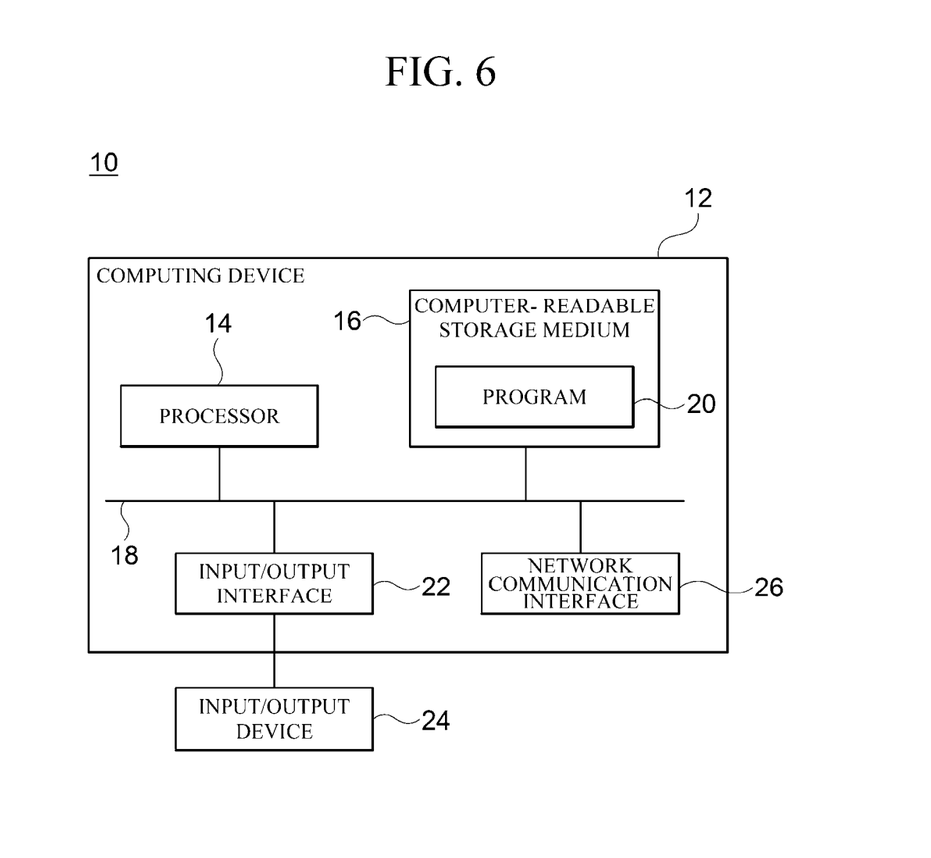
FIG. 6 is a block diagram illustratively describing a computing environment including a computing device suitable for use in exemplary embodiments.

FIG. 6 is a block diagram illustratively describing a computing environment 10 including a computing device suitable for use in exemplary embodiments. In the illustrated embodiment, each component may have different functions and capabilities in addition to those described below, and additional components may be included in addition to those described below.

The computing environment 10 illustrated includes a computing device 12. In an embodiment, the computing device 12 may be the apparatus for providing a speech video 100 or 200. The computing device 12 may be the server 203.

The computing device 12 includes at least one processor 14, a computer-readable storage medium 16, and a communication bus 18. The processor 14 may cause the computing device 12 to be operated according to the exemplary embodiment described above. For example, the processor 14 may execute one or more programs stored on the computer-readable storage medium 16. The one or more programs may include one or more computer-executable instructions, which, when executed by the processor 14, may be configured to cause the computing device 12 to perform operations according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (a volatile memory such as a random access memory, a non-volatile memory, or any suitable combination thereof), one or more magnetic disk storage devices, optical disk storage devices, flash memory devices, other types of storage media that are accessible by the computing device 12 and can store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

In the above, although representative embodiments of the present invention have been described in detail, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. A computing device comprising:
at least one processor;
a memory storing at least one program executed by the at least one processor;
a standby state video generating module that generates a standby state video in which a person in a video is in a standby state;
a speech state video generating module that generates a speech state video in which a person in a video is in a speech state based on a source of speech content; and
a video reproducing module that reproduces the standby state video, and generates a synthesized speech video by synthesizing the standby state video being reproduced and the speech state video,
wherein the video reproducing module generates the synthesized speech video by synthesizing a preset reference frame of the standby state video being reproduced and the speech state video,
wherein the standby state video generating module generates a standby state video having a preset reproduction time and generates one or more back motion images for one or more frames included in the standby state video; and
the video reproducing module returns the standby state video being reproduced to the reference frame based on the back motion image and generates the synthesized speech video by synthesizing the returned reference frame and the speech state video.

2. The computing device of claim 1, wherein the reference frame is a first frame of the standby state video.

3. The computing device of claim 1, wherein the back motion image is for image interpolation between a corresponding frame of the standby state video and the reference frame of the standby state video.

4. The computing device of claim 1, wherein the back motion image is generated at a preset frame interval among the frames included in the standby state video; and
the video reproducing module detects a closest frame having the back motion image among frames after a current frame of the standby state video being reproduced, and returns the standby state video to the reference frame based on the back motion image of the detected frame, and generate the synthesized speech video by synthesizing the returned reference frame and the speech state video.

5. The computing device of claim 1, wherein the video reproducing module reproduces the standby state video again from an end time point of the speech state video when the speech state video ends while the synthesized speech video is reproduced and reproduces the standby state video by returning the standby state video to the reference frame based on a back motion image of a last frame of the standby state video when the standby state video ends.

6. The computing device of claim 1, wherein the speech state video generating module generates an voice part and a video part of the speech state video, respectively, based on the source of the speech content and generates the video part for a face portion of the person in the standby state video.

7. The computing device of claim 6, wherein the video reproducing module replaces the face portion of the standby state video with the video part of the speech state video, and generates the synthesized speech video by synthesizing the standby state video in which the face portion is replaced and the voice part of the speech state video.

8. A computing device comprising:
   at least one processor;
   a memory storing at least one program executed by the at least one processor;
   a standby state video generating module that generates a standby state video in which a person in a video is in a standby state; and
   a video reproducing module that transmits a source of speech content to a server, receives a speech state video in which a person in a video is in a speech state from the server, reproduces the standby state video, and generates a synthesized speech video by synthesizing the standby state video being reproduced and the speech state video,
   wherein the video reproducing module generates the synthesized speech video by synthesizing a preset reference frame of the standby state video being reproduced and the speech state video,
   wherein the standby state video generating module generates a standby state video having a preset reproduction time and generates one or more back motion images for one or more frames included in the standby state video; and
   the video reproducing module returns the standby state video being reproduced to the reference frame based on the back motion image and generates the synthesized speech video by synthesizing the returned reference frame and the speech state video.

9. A method of providing a speech video, the method performed in a computing device that is provided with at least one processor and a memory for storing at least one program executed by the at least one processor, the method comprising:
   an operation of generating a standby state video in which a person in a video is in a standby state;
   an operation of generating a speech state video in which a person in a video is in a speech state based on a source of speech content;
   an operation of reproducing the standby state video, and generating a synthesized speech video by synthesizing a preset reference frame of the standby state video being reproduced and the speech state video;
   an operation of generating a standby state video having a preset reproduction time and generating one or more back motion images for one or more frames included in the standby state video; and
   an operation of returning the standby state video being reproduced to the reference frame based on the back motion image and generating the synthesized speech video by synthesizing the returned reference frame and the speech state video.

* * * * *